(12) United States Patent
Li et al.

(10) Patent No.: US 10,710,105 B2
(45) Date of Patent: Jul. 14, 2020

(54) DISPOSABLE CLEANING-FREE PAINT POT

(71) Applicants: Xiaorong Li, Zhejiang (CN); Zhenxing Ying, Zhejiang (CN); Bo Chen, Zhejiang (CN); Junpeng Wei, Zhejiang (CN); Fazheng Yang, Zhejiang (CN)

(72) Inventors: Xiaorong Li, Zhejiang (CN); Zhenxing Ying, Zhejiang (CN); Bo Chen, Zhejiang (CN); Junpeng Wei, Zhejiang (CN); Fazheng Yang, Zhejiang (CN)

(73) Assignee: Zhejiang Rongpeng Air Tools Co., Ltd., Taizhou, Zhejiang (CN)

( * ) Notice: Subject to any disclaimer, the term of this patent is extended or adjusted under 35 U.S.C. 154(b) by 275 days.

(21) Appl. No.: 15/798,427

(22) Filed: Oct. 31, 2017

(65) Prior Publication Data

US 2019/0126300 A1    May 2, 2019

(51) Int. Cl.
| | | |
|---|---|---|
| B05B 7/24 | (2006.01) | |
| B01D 35/30 | (2006.01) | |
| B65D 25/56 | (2006.01) | |
| B65D 43/02 | (2006.01) | |
| B65D 25/14 | (2006.01) | |
| B65D 53/02 | (2006.01) | |
| B05B 15/40 | (2018.01) | |

(52) U.S. Cl.
CPC .......... *B05B 7/2408* (2013.01); *B01D 35/306* (2013.01); *B05B 7/2478* (2013.01); *B05B 15/40* (2018.02); *B65D 25/14* (2013.01); *B65D 25/56* (2013.01); *B65D 43/0231* (2013.01); *B65D 53/02* (2013.01); *B01D 2201/24* (2013.01)

(58) Field of Classification Search
CPC ..... B05B 7/2408; B05B 7/2478; B05B 15/40; B65D 53/02; B65D 25/14; B65D 25/56; B65D 43/0231; B01D 35/306; B01D 2201/24
USPC ........ 239/302, 320, 345, 379, 600, DIG. 14; 220/319, 212, 293, 495.02, 570, 573.2; 215/274, 211, 216; 222/525, 105, 183
See application file for complete search history.

(56) References Cited

U.S. PATENT DOCUMENTS

| | | | | |
|---|---|---|---|---|
| 3,788,513 | A * | 1/1974 | Racz | A47J 36/02 428/622 |
| 3,831,850 | A * | 8/1974 | Hunter | B01F 13/002 239/144 |
| 4,117,945 | A * | 10/1978 | Mumford | B65D 50/046 215/216 |
| 4,273,247 | A * | 6/1981 | Earls | B65D 41/26 141/380 |
| 4,383,623 | A * | 5/1983 | Page | B65D 47/242 222/521 |

(Continued)

*Primary Examiner* — Chun Hoi Cheung
*Assistant Examiner* — Brijesh V. Patel (57) ABSTRACT

A disposable cleaning-free paint pot comprise a pot body and a pot lid covering an opening of the pot body, the pot lid including a pot lid connector and a feed hole disposed in the pot lid connector, the adapter including an external thread disposed at an outer wall, positioning blocks disposed at an inner wall thereof, a press plate and a clamping cam; the pot lid joint is including positioning slots engaging with the positioning blocks and an annular groove for the clamping cam. The paint pot from cleaning after spray coating, the cleanliness of paint pot is guaranteed, so that the paint pot is fitted on spray gun rapidly, and the paint can be mixed in the pot body.

9 Claims, 12 Drawing Sheets

(56) References Cited

U.S. PATENT DOCUMENTS

| | | | | |
|---|---|---|---|---|
| 4,807,786 A * | 2/1989 | Gueret | ............... | B65D 41/185 |
| | | | | 222/499 |
| 4,887,745 A * | 12/1989 | Gueret | ............... | B65D 41/185 |
| | | | | 222/499 |
| 5,209,362 A * | 5/1993 | Lutzker | ............... | B65D 51/145 |
| | | | | 215/225 |
| 5,209,365 A * | 5/1993 | Wood | ............... | B05B 7/2408 |
| | | | | 220/212 |
| 5,238,130 A * | 8/1993 | Marques | ............... | B65D 50/046 |
| | | | | 215/211 |
| 5,560,505 A * | 10/1996 | Schneider | ......... | B65D 47/0838 |
| | | | | 215/216 |
| 5,655,714 A * | 8/1997 | Kieffer | ............... | B05B 7/2402 |
| | | | | 222/464.3 |
| 5,850,951 A * | 12/1998 | Hayes | ............... | B65D 43/0212 |
| | | | | 222/525 |
| 6,543,648 B2 * | 4/2003 | de Pous | ............ | B05B 11/3049 |
| | | | | 215/274 |
| 6,938,836 B2 * | 9/2005 | Bouic | ............... | B05B 7/2408 |
| | | | | 239/328 |
| 6,945,429 B2 * | 9/2005 | Gosis | ............... | B05B 7/2408 |
| | | | | 222/105 |
| 7,048,975 B1 * | 5/2006 | Tojo | ............... | B65D 1/0207 |
| | | | | 428/213 |
| 7,172,139 B2 * | 2/2007 | Bouic | ............... | B05B 7/2408 |
| | | | | 239/345 |
| 7,712,682 B2 * | 5/2010 | Joseph | ............... | B05B 7/2478 |
| | | | | 239/302 |
| 7,798,425 B2 * | 9/2010 | Joseph | ............... | B05B 7/2408 |
| | | | | 239/345 |
| 7,810,744 B2 * | 10/2010 | Schmon | ............... | B05B 7/2478 |
| | | | | 222/105 |
| 7,823,806 B2 * | 11/2010 | Schmon | ............... | B05B 7/2408 |
| | | | | 239/290 |
| 7,845,582 B2 * | 12/2010 | Joseph | ............... | B05B 7/2408 |
| | | | | 137/843 |
| 8,051,999 B2 * | 11/2011 | Carmody | ........... | B65D 41/0471 |
| | | | | 215/216 |
| 8,127,963 B2 * | 3/2012 | Gerson | ............... | B05B 7/2408 |
| | | | | 220/495.02 |
| 2006/0017286 A1 * | 1/2006 | Kosmyna | ............. | B05B 7/2408 |
| | | | | 285/305 |
| 2009/0014557 A1 * | 1/2009 | Schmon | ............... | B05B 7/2408 |
| | | | | 239/302 |
| 2012/0000992 A1 * | 1/2012 | Shih | ............... | B05B 7/2408 |
| | | | | 239/302 |
| 2012/0291890 A1 * | 11/2012 | Pan | ............... | B05B 7/2408 |
| | | | | 137/544 |
| 2013/0168468 A1 * | 7/2013 | Pellegrino | ............... | B05B 7/24 |
| | | | | 239/302 |
| 2013/0270272 A1 * | 10/2013 | Smith | ............... | B65D 41/0414 |
| | | | | 220/288 |
| 2014/0054307 A1 * | 2/2014 | Collins | ............... | B44D 3/12 |
| | | | | 220/780 |
| 2014/0083558 A1 * | 3/2014 | Gerson | ............... | B05B 7/2408 |
| | | | | 141/10 |
| 2015/0158657 A1 * | 6/2015 | Olson | ............... | B65D 81/3841 |
| | | | | 220/592.27 |
| 2017/0021995 A1 * | 1/2017 | Corbett | ............... | B65D 11/02 |
| 2017/0203887 A1 * | 7/2017 | Hegdahl | ............... | B65D 47/06 |

* cited by examiner

DISPOSABLE CLEANING-FREE PAINT POT

BACKGROUND OF INVENTION

1. Field of the Invention

The present invention relates generally to a disposable cleaning-free paint pot.

2. Description of Related Art

The paint pot is a device for loading oil paint, it is screwed on the spray gun via a joint before use. According to different requirements, the oil paint loaded in the paint pot is different each time. When the spray coating requirement is known, the worker mixes the paint in the paint mixing cup according to the required volume of paint, and then pours the mixed paint into the paint pot for the spray gun, so the pot body must remain clean. If there is paint left last time adhering to the inside of pot body, when the mixed paint is poured into the pot body, it is mixed with the residual paint, so that the paint properties are changed, influencing the spray coating effect. In order to guarantee the cleanliness of pot body, every time when the spray coating is finished, the pot body shall be detached and cleaned, it is troublesome, and the residual paint in the pot body must be dumped, wasting resources.

The conventional paint pot is fixed to the spray gun via a joint on one end of the pot lid, and the joint is connected to the spray gun by screw thread. Therefore, for mounting the paint pot, the worker shall turn the paint pot for a number of turns corresponding to the thread turns to fix the paint pot. However, the pot body is big, this assembling method takes much time, and the continuous turning action is likely to make the hand sore and tired.

The pot body surface of conventional paint pot is only provided with unidirectional scale marks, which clarifies the paint volume in the paint pot for the worker. However, the maximum scale value of unidirectional scale marks is not located in the end of pot body, so when the paint pot is inverted, the paint volume in the paint pot cannot be known from the unidirectional scale marks. Therefore, the paint pot shall be inverted when the paint pot is filled with paint, but under the constraint of unidirectional scale marks, the paint intake volume cannot be known from the unidirectional scale marks. In order to know the paint intake volume, the paint shall be mixed in the paint mixing cup with corresponding scale marks before it is poured into the paint pot. This paint mixing mode needs two containers, the operation steps are increased, and the paint adheres to the inner wall of paint mixing cup when the paint is being poured, so that the actual paint volume in the paint pot is less than the volume of paint mixed in the mixing cup.

When the spray gun has finished spray coating, the paint pot is dismounted in general. The paint pot contains residual paint, in order to avoid the volatilization of volatile matter in the paint influencing the air quality and the viscosity of paint, or to avoid the impurities outside the pot contaminating the residual paint, the joint of paint pot is blocked by pot plug for sealing. However, it is mostly inner cone fit or outer cone fit between the conventional pot plug and joint, there will not be slippage between the pot plug and inner wall of joint, but the tightening force between pot plug and joint is extremely strong, the worker has to apply an extremely strong external force to take out the pot plug from the joint or jam it into the joint, so it is laborious and adverse to operation and use.

SUMMARY OF THE INVENTION

It is an object of the present invention to overcome the drawbacks of the prior art and to provide a disposable cleaning-free paint pot comprising: a pot body and a pot lid covering an opening of the pot body, the pot lid including a pot lid connector and a feed hole disposed in the pot lid connector; wherein the pot body is made of disposable transparent aviation material; the pot lid connector includes an adapter or a pot plug sleeved thereon; the adapter having positioning blocks symmetrically disposed in an inner wall thereof and an external thread disposed at one end thereof; the pot lid connector includes positioning slots engaging with the positioning blocks and an annular groove disposed on an outer wall thereof; the adapter includes mobile holes disposed symmetrically on both sides thereof, a press plate hinged to the mobile hole, and a clamping cam connected to the press plate; the clamping cam partially passes through the mobile hole into the adapter and corresponds to the annular groove; the pot lid connector includes an annular recess disposed outside thereof;

wherein the pot plug seals the feed hole and includes a ring sealed tube disposed in an upper inner wall thereof and engaging with the feed hole, the ring sealed tube is obverse truncated cone shape; a retaining ring disposed therein, surrounding the ring sealed tube, and having a movable space between the retaining ring and the inner wall of the pot plug; a plurality of buffer slots distributed uniformly in circumference of the retaining ring; a plurality of elastic strips formed uniformly on circumference of the retaining groove; a plurality of hooks disposed in a bottom inner wall of the elastic strip and engaging with the annular groove; a plurality of guide blocks disposed in an inner wall of the retaining ring and distributed uniformly in circumference, the plurality of guide blocks forming an inner circle diameter $d1$ which is smaller than an inner diameter $d2$ formed by the plurality of hooks; and a resilient groove disposed in the bottom inner wall of the elastic strip, which is disposed above the hook.

More preferably, wherein the feed hole includes a restraining step disposed therein; a matching filter disposed therein, a bottom of the filter attached to the restraining step; and a lifting stem protruding into an inner space of the pot lid in the top of the filter.

More preferably, wherein the pot lid connector includes a seal portion disposed at one end thereof; the seal portion is cylindrical; the seal portion and the pot lid connector are transitionally connected by a cone step; the adapter includes a closed cell disposed therein and sealed with seal portion, and a beveled step bonding the cone step; the closed cell and seal portion are a cylinder seal therebetween, and the cone step and beveled step are a cone seal therebetween.

More preferably, wherein the pot lid includes an annular inner cone disposed therein and a caulking groove formed between the inner cone and an inner wall thereof; one end with the opening of the pot body is embedded in the caulking groove; an outer cone of the inner cone and the inner wall of pot body bond together.

More preferably, wherein the inner wall of the pot body is covered with nano-coating.

More preferably, wherein the pot body includes forward scale marks and reverse scale marks disposed on an outer wall thereof; the forward scale marks start from one end without the opening of the pot body, extending towards the end with the opening of the pot body, and the graduation increases gradually; the reverse scale marks start from the end with the opening of the pot body, extending towards the other end of the pot body, and the graduation increases gradually.

More preferably, wherein the screw thread for connecting the pot body to pot lid is three-start screw.

More preferably, wherein the ring sealed tube and retaining ring have a spacing ring therebetween, the spacing ring is opposite to pot lid connector; the height of the spacing ring is smaller than the height of ring sealed tube; a lower end face of the spacing ring is even with an outer end face of the pot lid connector; the spacing ring and the ring sealed tube have a flexible spacing disposed therebetween.

More preferably, wherein the annular groove includes an acclivitous upper bevel face disposed on an upper wall thereof; the hook includes a declivitous lower bevel face disposed at an upper end thereof, the lower bevel face and upper bevel face bond tightly.

DETAILED DESCRIPTION OF THE INVENTION

FIGS. 1 to 12 show the disposable cleaning-free paint pot of the present invention, comprising a pot body 1, an opening 2 in one end of pot body 1 and a pot lid 3 connected to pot body 1 by screw thread. The pot lid 3 covers opening 2, a pot lid connector 4 is located at one end of pot lid 3. A feed hole 5 connected to the inner space of pot body 1 is located in pot lid connector 4. The pot body 1 is made of disposable transparent aviation material. An adapter 6 or a pot plug 14 is fitted over pot lid connector 4. The outer wall of one end of adapter 6 is provided with external thread 7. The inner wall of adapter 6 is provided with mutually symmetrical positioning blocks 8. The outer wall of pot lid connector 4 is provided with positioning slot 9 matching positioning block 8. The outer wall of pot lid connector 4 is provided with annular groove 10. The inner wall of annular groove 10 is arcwall face. There are mutually symmetrical mobile holes 11 on both sides of adapter 6. The mobile hole 11 is connected to the inner space of adapter 6. A press plate 12 outside adapter 6 is hinged at mobile hole 11. The press plate 12 is connected to a clamping cam 13. The clamping cam 13 partially penetrate through mobile hole 11 into adapter 6. The location of clamping cam 13 corresponds to the location of annular groove 10. The pot plug 14 seals feed hole 5. An annular groove 15 is located outside pot lid connector 4. A ring sealed tube 16 matching feed hole 5 is located in the middle of upper inner wall of pot plug 14. The ring sealed tube 16 is obverse truncated cone shaped. A retaining ring 17 is located in pot plug 14. The retaining ring 17 surrounds ring sealed tube 16. There is a movable space 18 between retaining ring 17 and inner wall of pot plug 14. The retaining ring 17 is provided with several buffer slots 19 distributed uniformly in circumference. The retaining ring 17 forms several elastic strips 20 distributed uniformly in circumference through buffer slots 19. The inner wall at the bottom of elastic strip 20 is provided with hook 21 clamping annular groove 15. The inner wall of retaining ring 17 is provided with several guide blocks 22 distributed uniformly in circumference. The diameter d1 of inner circle formed of several guide blocks 22 is smaller than the diameter d2 of inner circle formed of several hooks 21. The inner wall at the bottom of elastic strip 20 is provided with a resilient groove 23. The resilient groove 23 is located above hook 21.

Figure 2:
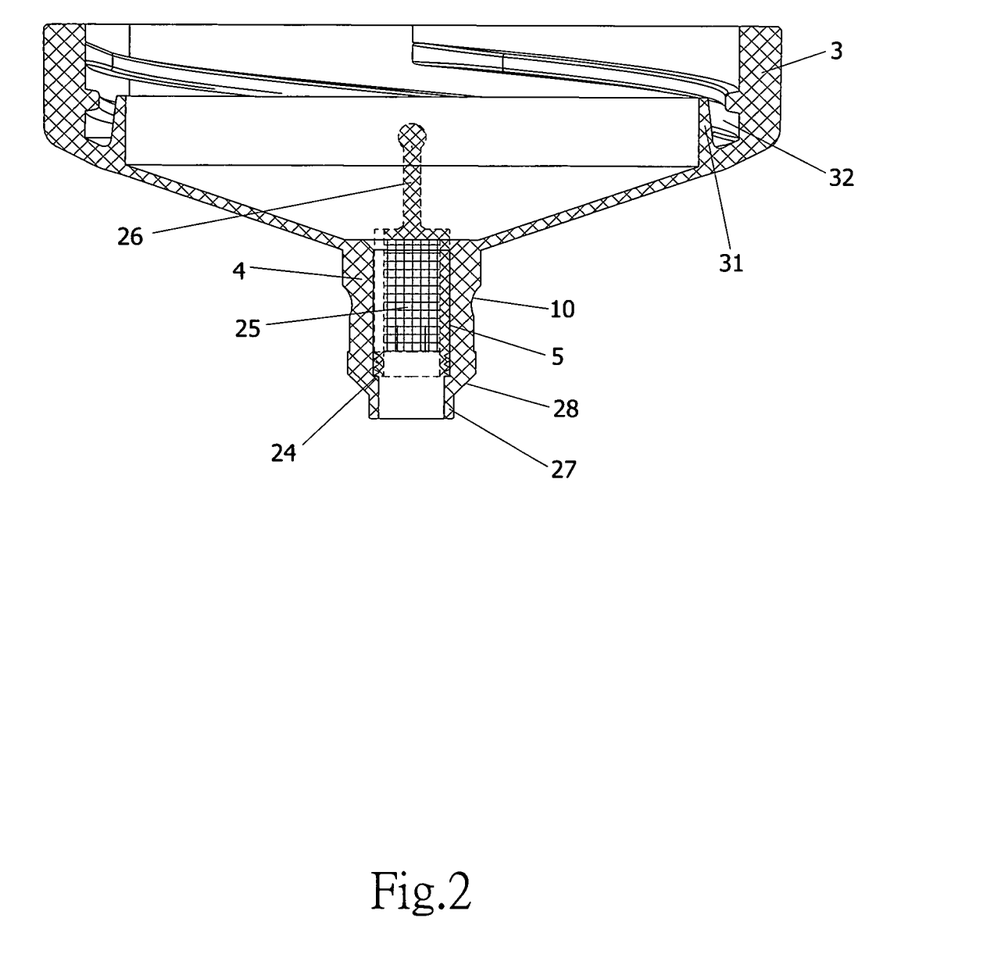
FIG. 2 is a sectional view of a pot lid.

A restraining step 24 is located in said feed hole 5. A matching filter 25 is mounted in feed hole 5. The bottom of filter 25 is clamped by restraining step 24. The top of the filter 25 is provided with a lifting stem 26 protruding into the inner space of pot lid 3. When the paint in pot body 1 flows through feed hole 5, the filter 25 filters the paint, the large sized matter in the paint is isolated, the flowability of paint is maintained, so that the spray coating effect of spray gun is protected. The restraining step 24 prevents the filter 25 from slipping with the flowing paint. In addition, the filter 25 can be dismounted by using lifting stem 26 to lift and release the filter 25, and the tight fit between filter 25 and the inner wall of feed hole 5 can enhance the firmness of filter 25 in use, preventing the filter 25 from slipping off.

One end of said pot lid connector 4 is provided with a seal portion 27 (FIG. 2). The seal portion 27 is cylindrical. The seal portion 27 and pot lid connector 4 are transitionally connected by cone step 28. The adapter 6 contains a closed cell 29 mutually sealed with seal portion 27 (FIG. 3) and a beveled step 30 bonding the cone step 28. A cylinder seal is located between closed cell 29 and seal portion 27; and a cone seal is located between cone step 28 and beveled step 30. Said cylinder seal and cone seal form double seal between pot lid connector 4 and adapter 6, leading to positive confinement between them, there will not be leak.

An annular inner cone 31 is located in said pot lid 3 (FIG. 2). A caulking groove 32 is formed between inner cone 31 and inner wall of pot lid 3. The end with opening 2 of pot body 1 is embedded in caulking groove 32. The caulking groove 32 makes the inner cone 31 elastic to some extent. When the end with opening 2 of pot body 1 is embedded in caulking groove 32, the end of pot body 1 extrudes the conical surface of inner cone 31 continuously, the inner cone 31 clings to the inner wall of pot body 1 for its elasticity, so that the airtightness between pot body 1 and pot lid 3 is enhanced, and the paint in pot body 1 will not leak out.

Figure 6:
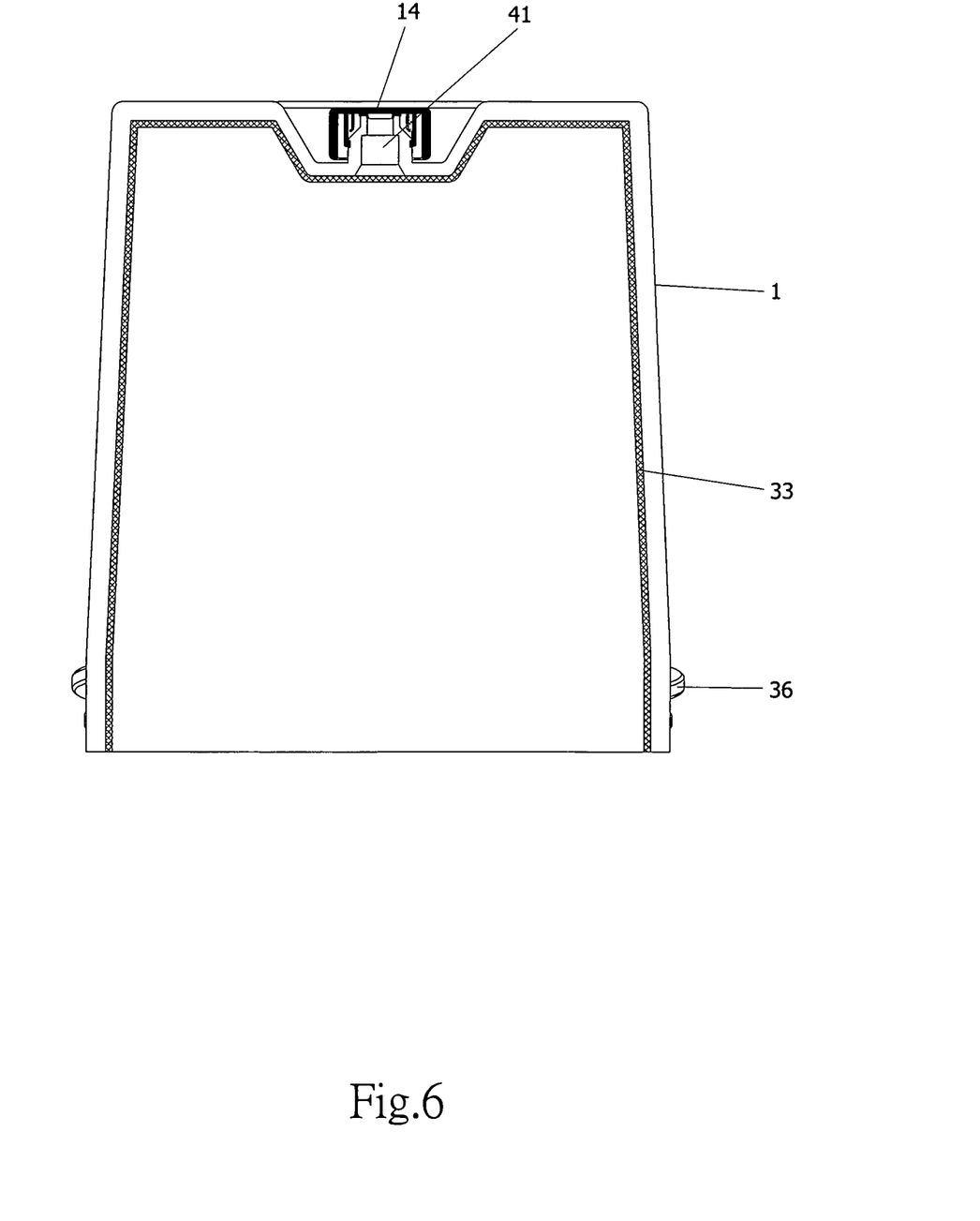
FIG. 6 is a sectional view of the pot body.

The inner wall of said pot body 1 is covered with nano-coating 33, which prevents the paint from adhering to the inner wall of pot body 1 effectively, so that the paint can be fully used without waste.

Figure 5:
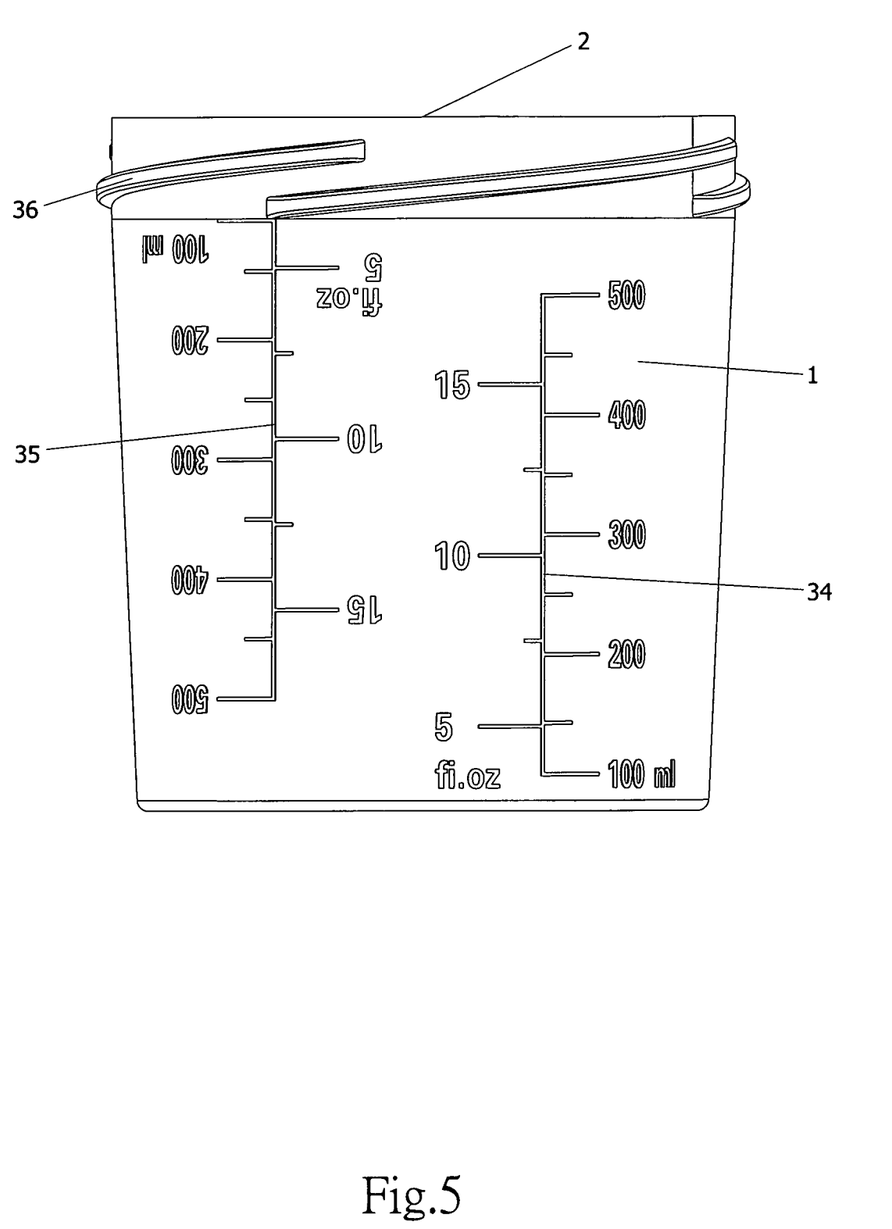
FIG. 5 is a schematic diagram of a pot body.

The outer wall of said pot body 1 is provided with forward scale marks 34 and reverse scale marks 35. The forward scale marks 34 start from the end without opening 2 of pot body, extending towards the end with opening 2 of pot body 1, the graduation increases gradually. Said reverse scale marks 35 start from the end with opening 2 of pot body 1, extending towards the other end of pot body 1, the graduation increases gradually.

Said forward scale marks 34 enable the pot body 1 to be used for paint mixing. The paint is poured into pot body 1 through opening 2, and then the paint is mixed according to forward scale marks 34. The perspective effect of transparent pot body 1, nonviscous effect of nano-coating and forward scale marks 34 are convenient for worker to control the paint volume and paint additive proportion effectively. When the mixing is finished, the paint pot is inverted and fixed to the spray gun, the pot plug 14 over the air hole 41 in the bottom of pot body 1 is pulled out, the worker knows the paint consumption for each spray coating according to the reverse scale marks 35, and knows how much spray coating work can be finished by a pot of paint. Before spray coating, the scale value of paint volume on forward scale marks 34 is identical with the scale value on reverse scale marks 35, this one-container paint mixing can avoid the paint adhering to the original container when pouring the paint from a container into another container, that wastes paint volume, and mixing paint in the paint pot directly can reduce the number of containers for paint mixing, the paint mixing work can be done by using only one container, reducing the paint mixing steps and workload.

The screw thread for connecting said pot body 1 to pot lid 3 is three-start screw 36, favorable for the worker to finish tightening, so that the pot body 1 and pot lid 3 can be screwed together rapidly, as well as separated rapidly, increasing the assembly and disassembly efficiency of paint pot.

There is a spacing ring 37 between said ring sealed tube 16 (FIG. 8) and retaining ring 17. The location of spacing ring 37 is opposite to the location of pot lid connector 4. The height of spacing ring 37 is smaller than the height of ring sealed tube 16. The lower end face of spacing ring 37 is even with the outer end face of pot lid connector 4. There is a flexible spacing 38 between spacing ring 37 and ring sealed tube 16.

Figure 8:
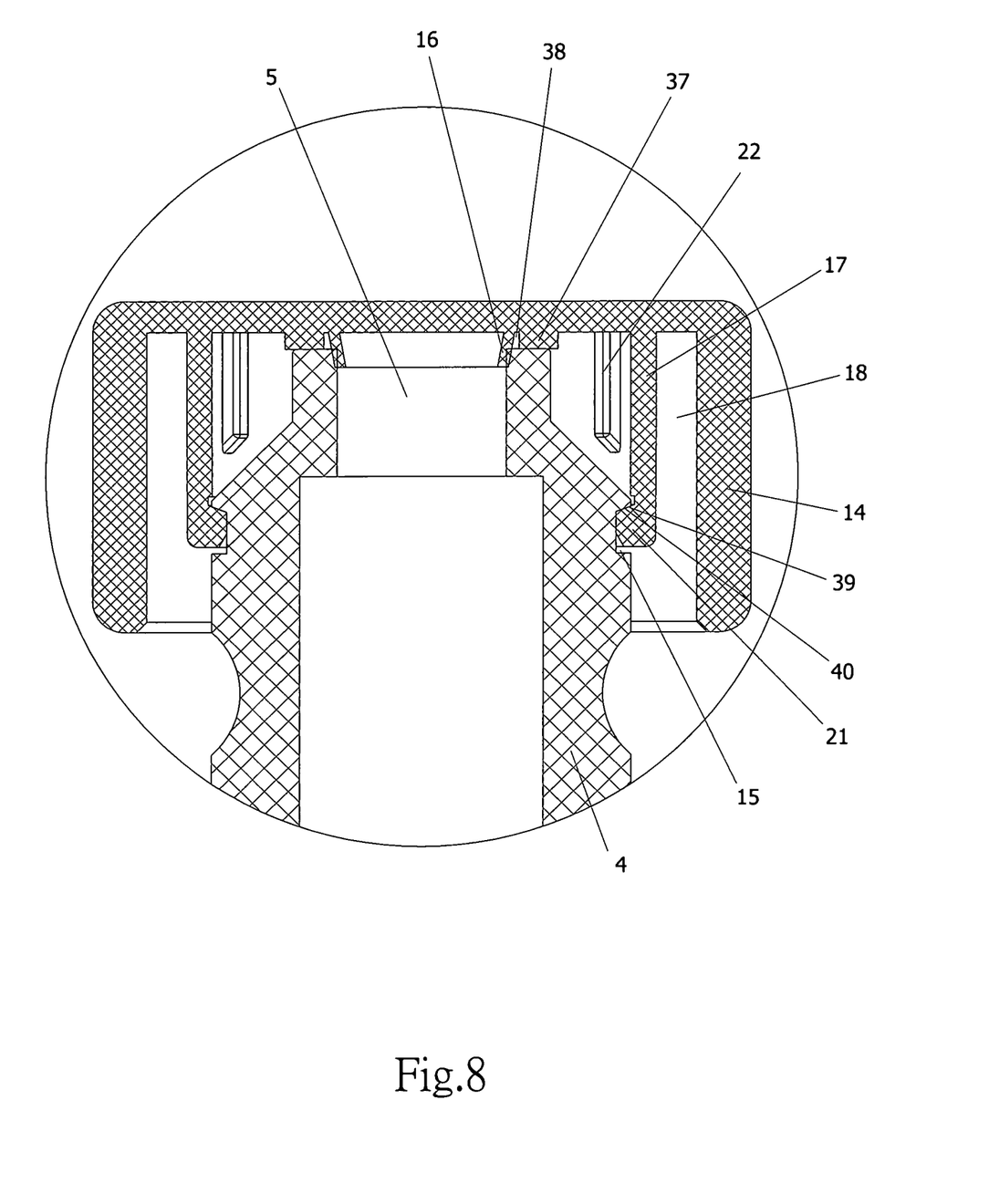
FIG. 8 is an enlarged view of FIG. 7A.
Figure 9:
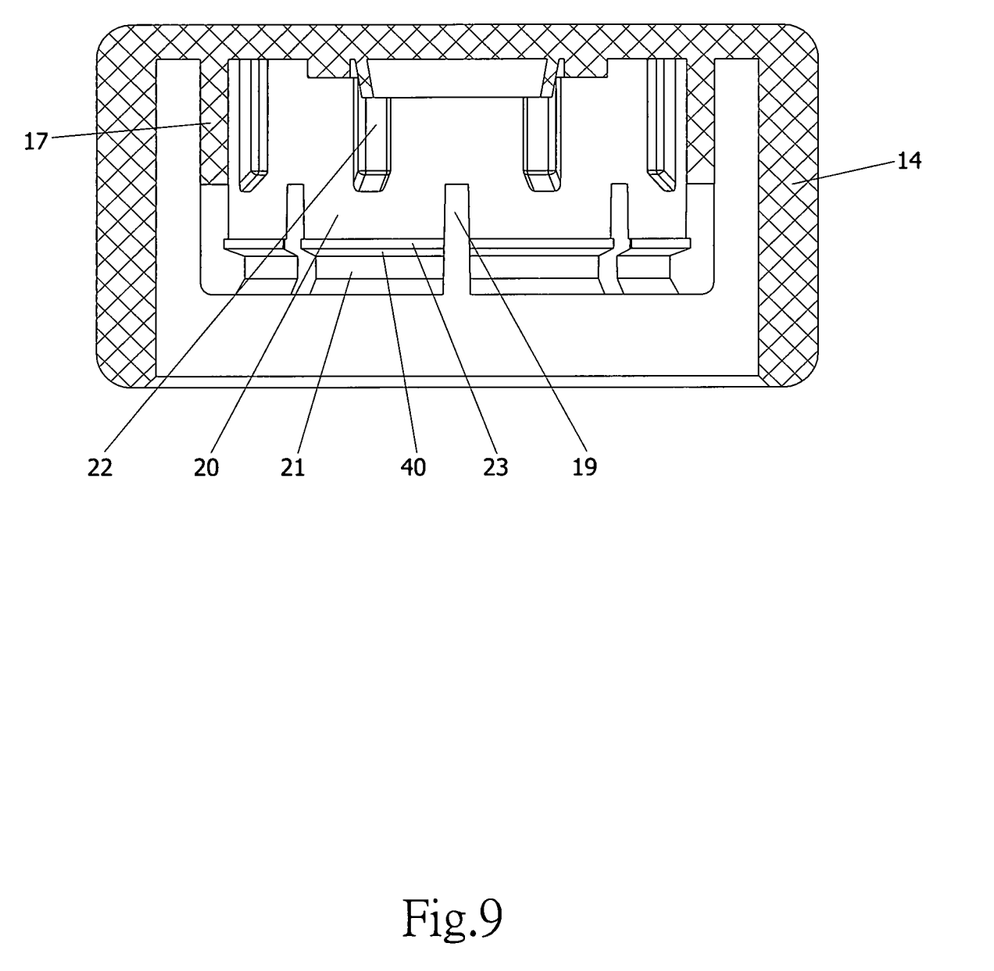
FIG. 9 is a schematic diagram of the pot plug.

Said spacing ring 37 can adjust the degree of balance of pot plug 14, so that the end face of ring sealed tube 16 is parallel to the orifice end face of feed hole 5, there will not be tilt, the sealing property between them is guaranteed. The flexible spacing 38 makes the ring sealed tube 16 have a transformable space, which is elastic to some extent, favorable for the seal between ring sealed tube 16 and feed hole 5, so that the ring sealed tube 16 can regulate its location automatically, remaining in straightforward state.

The upper wall of said annular groove 15 is provided with an acclivitous upper bevel face 39 (FIG. 8). The upper end of hook 21 is provided with a declivitous lower bevel face 40. The lower bevel face 40 and upper bevel face 39 bond tightly. When the hook 21 is clamped in annular groove 15, the lower bevel face 40 can be clamped in annular groove 15 rapidly along the track of upper bevel face 39. When the hook 21 slides out of annular groove 15, the lower bevel face 40 can slide out annular groove 15 rapidly along the track of upper bevel face 39. Therefore, by means of the cooperation between lower bevel face 40 and upper bevel face 39, the slideout and clamping of hook 21 are smoother, and the pot plug 14 is removed from or fitted on pot lid connector 4 more easily.

The usage of the present invention is described below:

Said pot body 1 is made of disposable transparent aviation material, the use-cost is very low, so it can be discarded directly after the loaded paint is used up, implementing cleaning free. A new pot body will be used to load new paint for another spray coating work. When the spray coating is finished, if there is paint left in pot body 1, the pot body 1 can be kept for next spray coating with this paint, so as to avoid waste. For keeping the residual paint, as long as the opening 2 of pot body 1 is sealed to guarantee that the paint properties will not change. When the pot body 1 keeps residual paint, if another paint is required for spray coating, another disposable pot body 1 can be used to load paint, the loading of other paints will not be affected.

Figure 1:
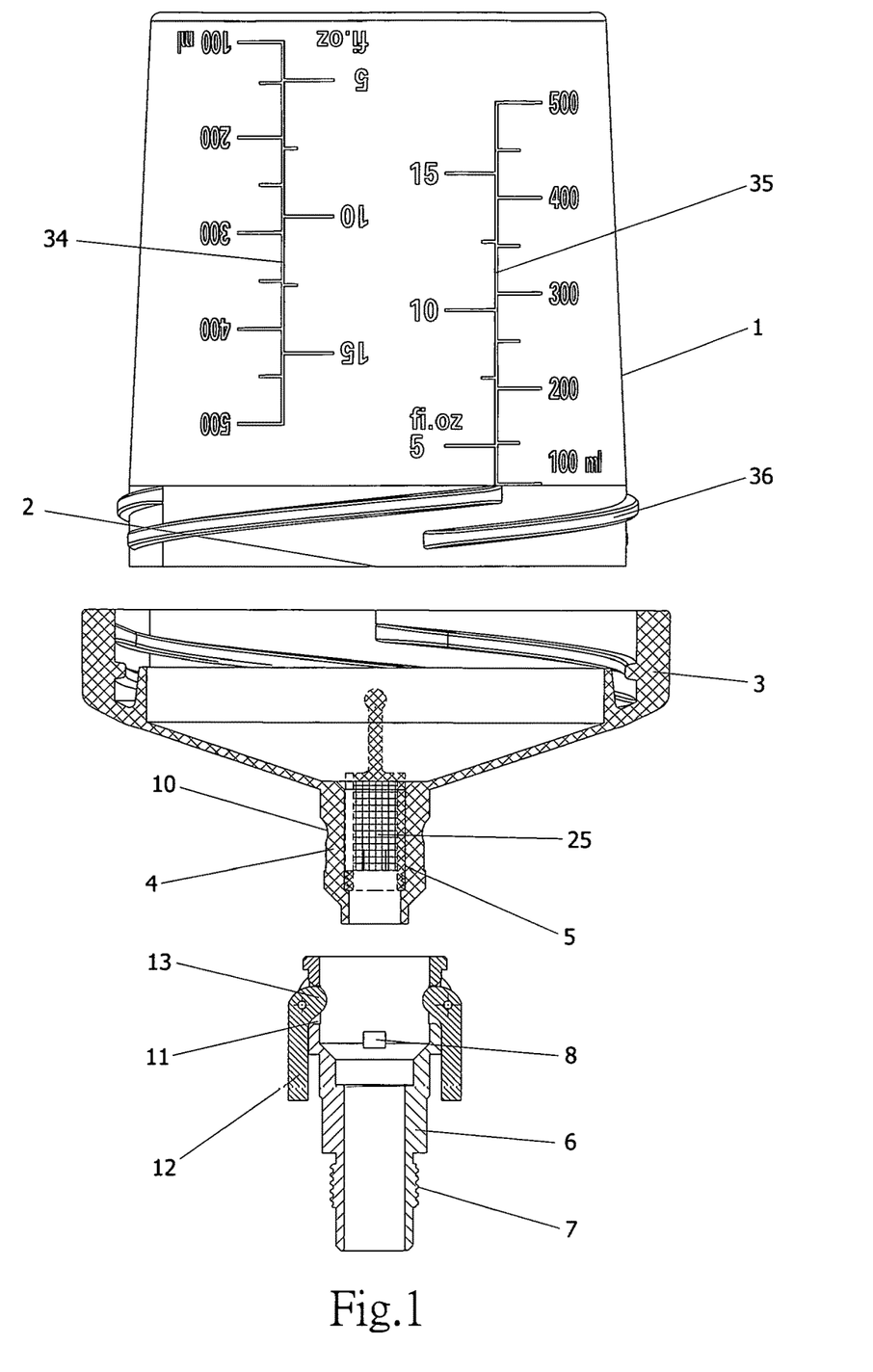
FIG. 1 is a schematic diagram of an adapter fitted over a pot lid connector of a paint pot of the present invention.
Figure 3:
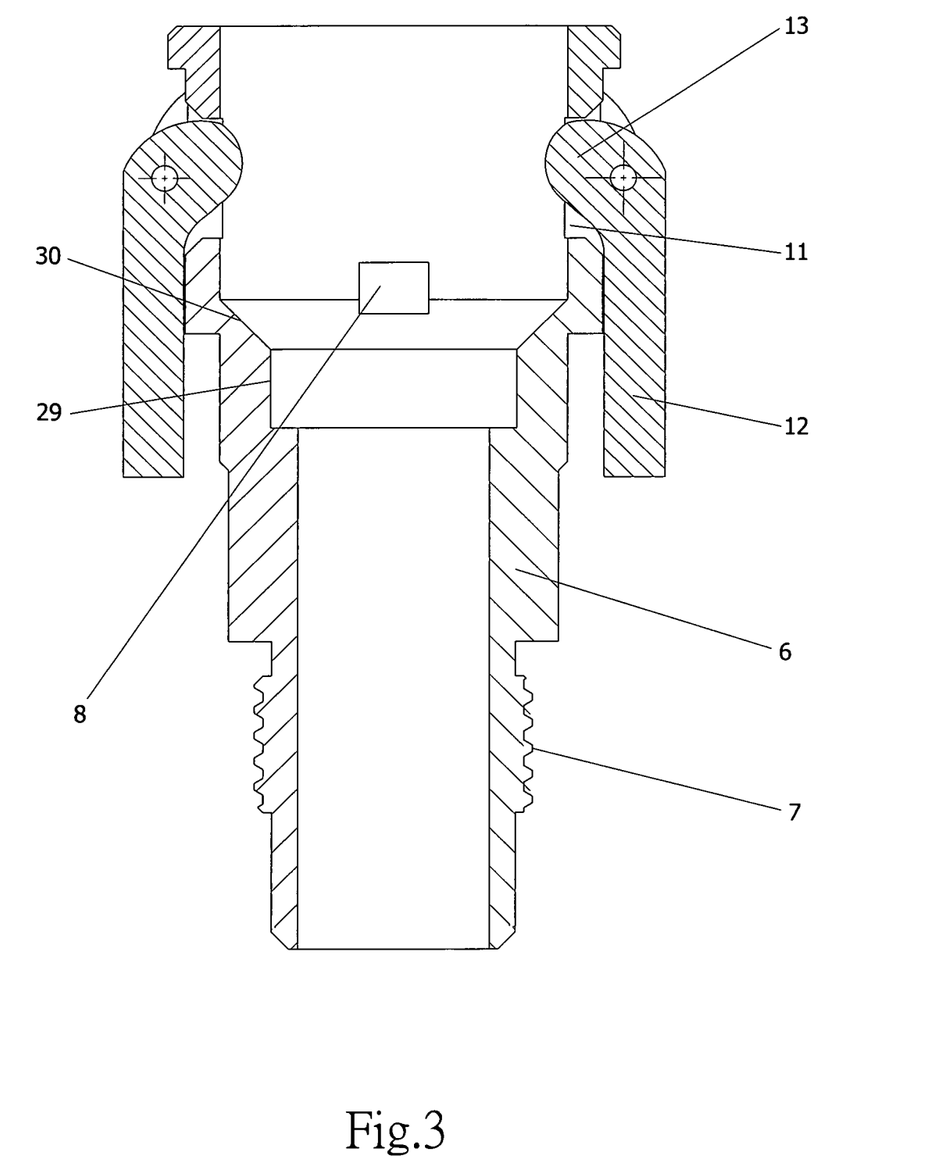
FIG. 3 is a schematic diagram of the adapter.
Figure 4:
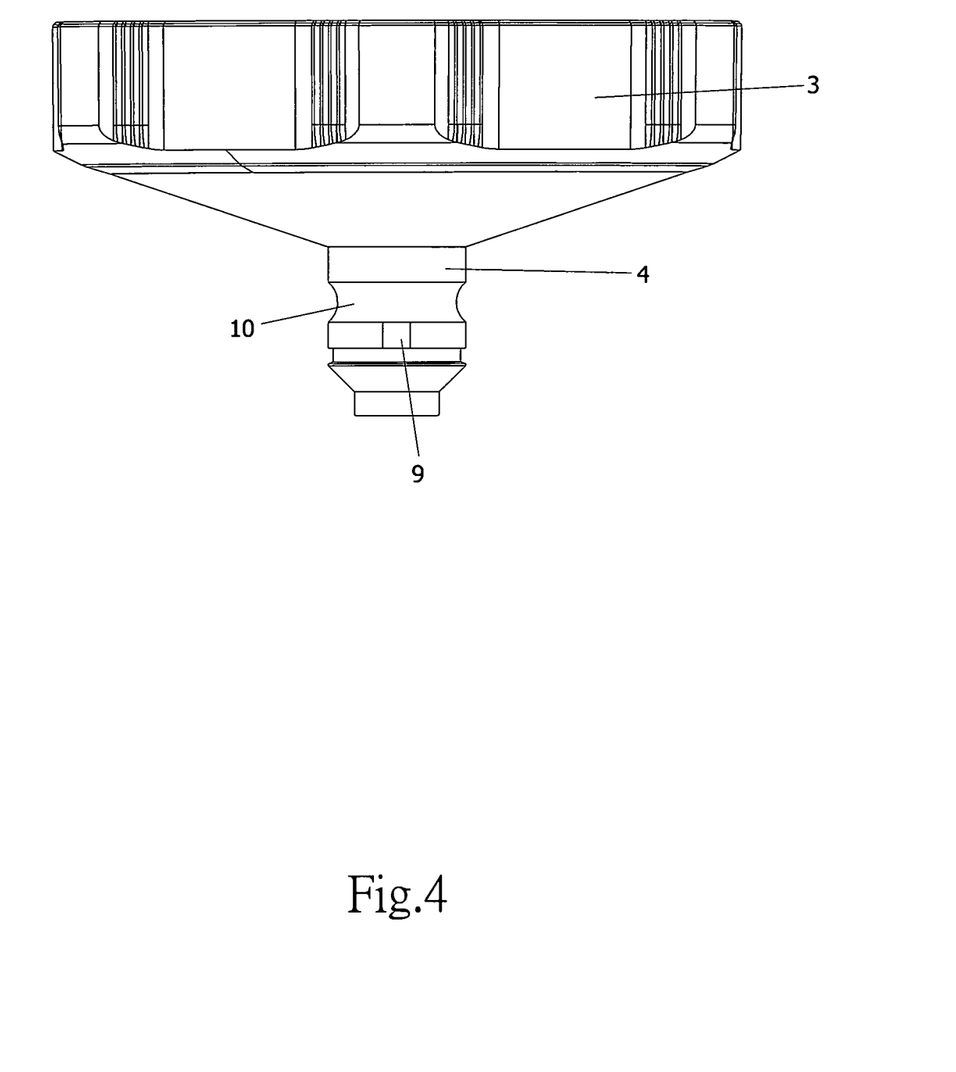
FIG. 4 is a schematic diagram of the pot lid.

In terms of connection between paint pot and spray gun, an adapter 6 is fitted over pot lid connector 4, the adapter 6 is removed from pot lid connector 4 before the paint pot is fixed to spray gun, and then the adapter 6 and spray gun are screwed together by the external thread 7. When the adapter 6 is fixed, the paint pot is connected to spray gun by adapter 6.

For loading paint, the pot lid 3 is screwed off pot body 1, the mixed paint in the paint mixing cup is poured into pot body 1 through opening 2, the pot lid 3 is screwed down with pot body 1, and then the pot lid connector 4 of pot lid 3 is inserted into adapter 6. In the process of inserting, the positioning block 8 in adapter 6 is embedded in positioning slot 9, the interlocking of positioning block 8 and positioning slot 9 not only positions the pot lid connector 4, but also restricts the rotation of pot lid connector 4. When the pot lid connector 4 is positioned, the annular groove 10 corresponds to the location of clamping cam 13, the worker can pull the press plate 12, so that the press plate 12 turns up taking its hinge point as the center of circle, the clamping cam 13 drops and enters annular groove 10, the pot lid connector 4 is fixed to adapter 6 to avoid up-and-down movement or shake, so as to guarantee the firmness of connection between paint pot and spray gun, and the time for connecting paint pot to spray gun is shortened, the worker's hands will not be overloaded, and the workload is reduced.

In the course of use, in order to make sure the paint in the paint pot can enter the spray gun, there is an air hole 41 in the top of paint pot (FIG. 6), connecting the outside to the inner space of paint pot, so as to avoid vacuum in the paint pot stopping the paint from flowing. When the spray coating is finished, if there is paint left in the pot body 1, the worker can use pot plug 14 to seal the air hole 41 in the pot body. The pot lid connector 4 is screwed off spray gun, the paint pot is separated from spray gun, and then the pot plug 14 can be mounted on pot lid connector 4. In the assembling process of pot plug, the guide block 22 on the inner wall of retaining ring 17 bonds the outer wall of pot lid connector 4, the guide block 22 prevents the pot plug from tilting, and guarantees the concentricity between pot plug and joint, preventing poor airtightness. When the pot plug 14 moves continuously along the outer wall track of pot lid connector 4, the ring sealed tube 16 is embedded in the feed hole 5 of pot lid connector 4. As the ring sealed tube 16 is obverse truncated cone shaped, the deeper the ring sealed tube 16 goes into feed hole 5, the higher is the stress on their contact position, the higher is the sealing strength, and the better is the sealing effect.

Figure 7:
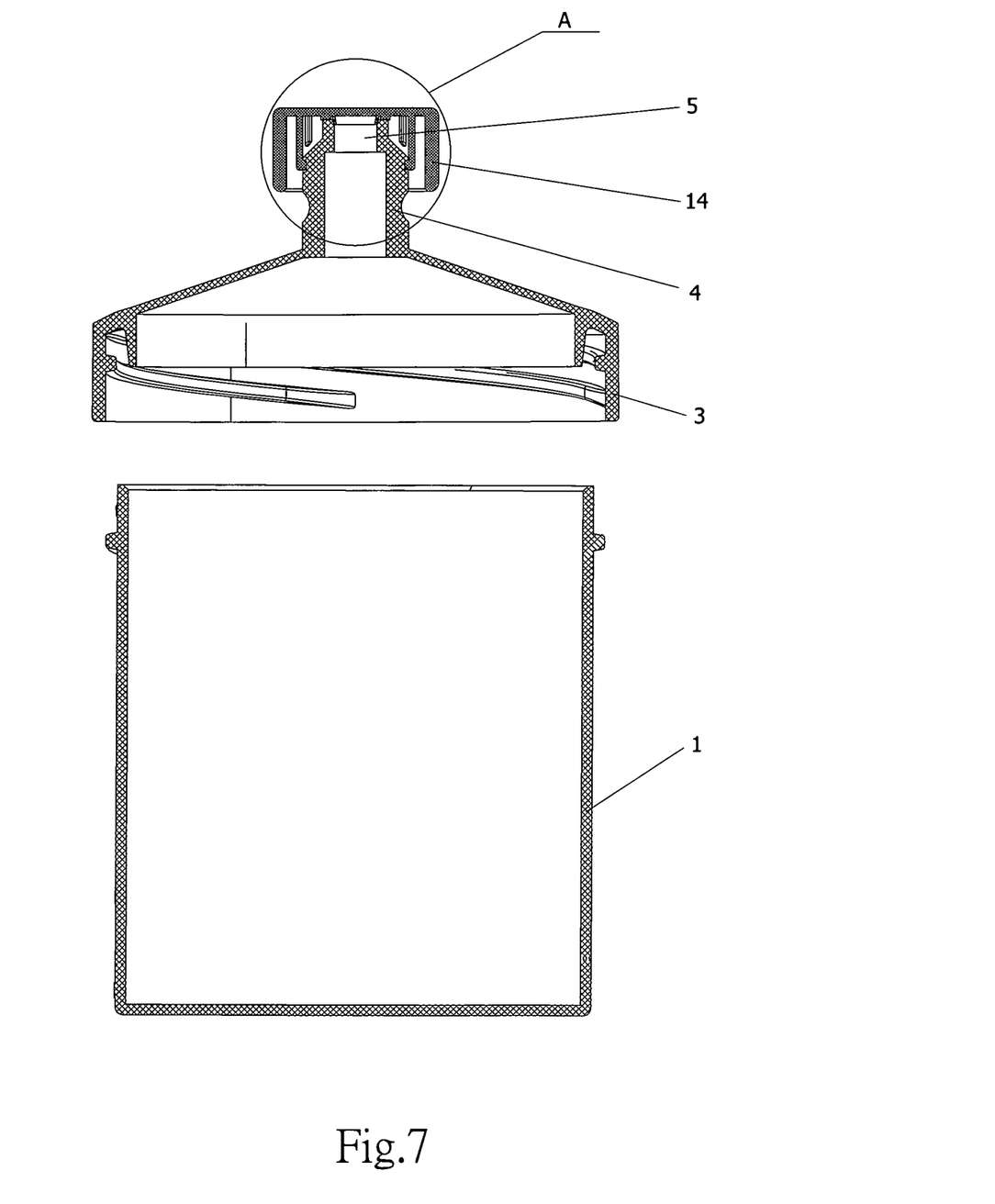
FIG. 7 is a schematic diagram of a pot plug fitted over the pot lid connector of the paint pot of the present invention.

As the pot plug 14 moves continuously, the hook 21 at the bottom of elastic strip 20 is clamped in annular groove 15, when the hook 21 is clamped in annular groove 15, the pot plug 14 is fixed to the pot lid connector 4, the pot lid connector 4 is sealed by pot plug 14, the residual paint in the paint pot body 1 will not volatilize, and the outside impurities cannot contaminate the residual paint.

To use the residual paint in the paint pot, the worker can apply external force to the pot plug 14 to pull it outward. As the hook 21 is located at the bottom of elastic strip 20 of retaining ring 17, the elastic strip 20 is formed of several buffer slots 19 distributed uniformly in circumference, so the elastic strip 20 is elastic, it can be bent to some extent. When the pot plug is pulled outward, under the external force, the elastic strip 20 is bent, the hook 21 slides out of annular groove 15. As the bottom inner wall of elastic strip 20 is provided with resilient groove 23, the rigid connection between hook 21 and elastic strip 20 turns into flexible connection. Therefore, the hook 21 can be bent to some extent, too. The slideout of hook 21 is enhanced, the hook 21 can slide out of annular groove 15 instantly under external force. There is a movable space 18 between retaining ring 17 and the inner wall of pot plug 14, which provides the hook 21 with adequate bending space, favorable for slideout or clamping of hook 21. When the hook 21 is separated from annular groove 15, the pot plug 14 can be separated from pot lid connector 4 easily.

Therefore, the ring sealed tube 16 in the pot plug 14 blocks the feed hole 5 in the pot lid connector 4, and the fixing of pot plug 14 is implemented by the engagement of hook 21 and annular groove 15. The resilient groove 23 and buffer slot 19 can enhance the elasticity of hook 21, so as to enhance the slideout of hook 21. If the worker apply an external force to pot plug 14, the pot plug 14 can be removed or assembled easily, and the residual paint can be used or kept easily.

Figure 10:
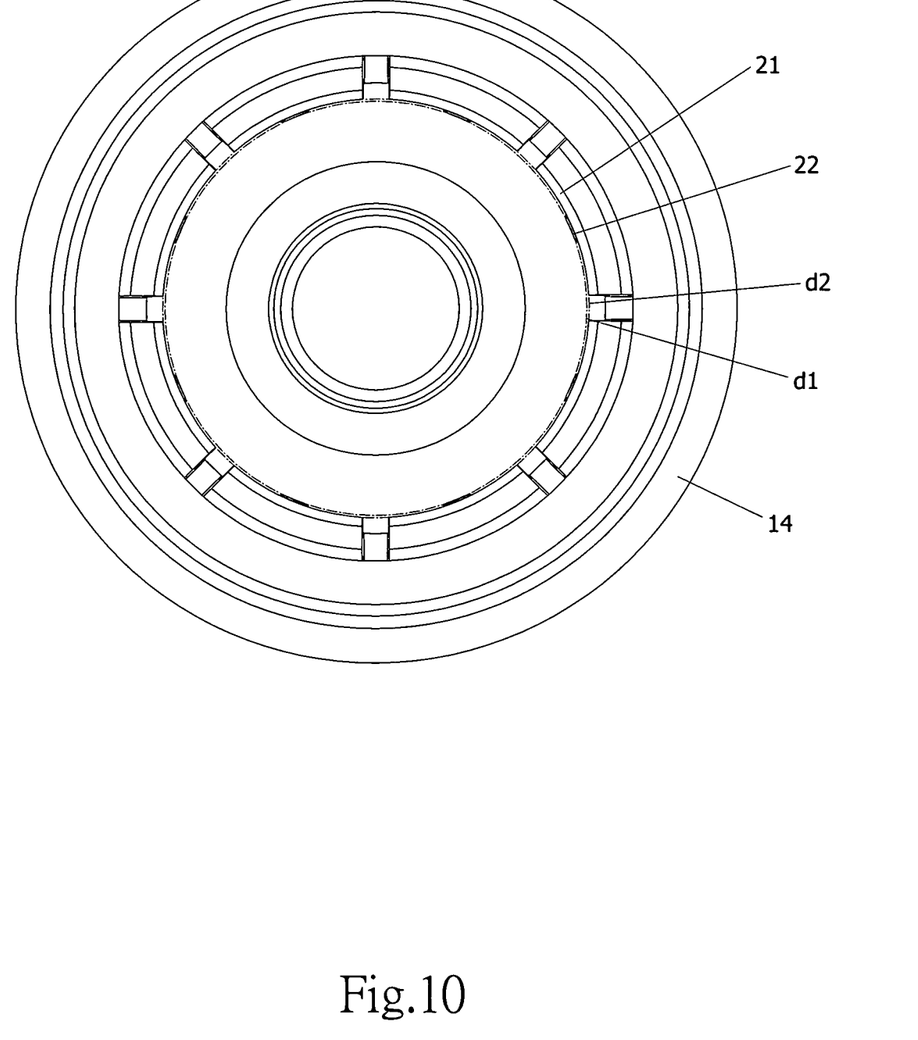
FIG. 10 is an upward view of the pot plug.
Figure 11:
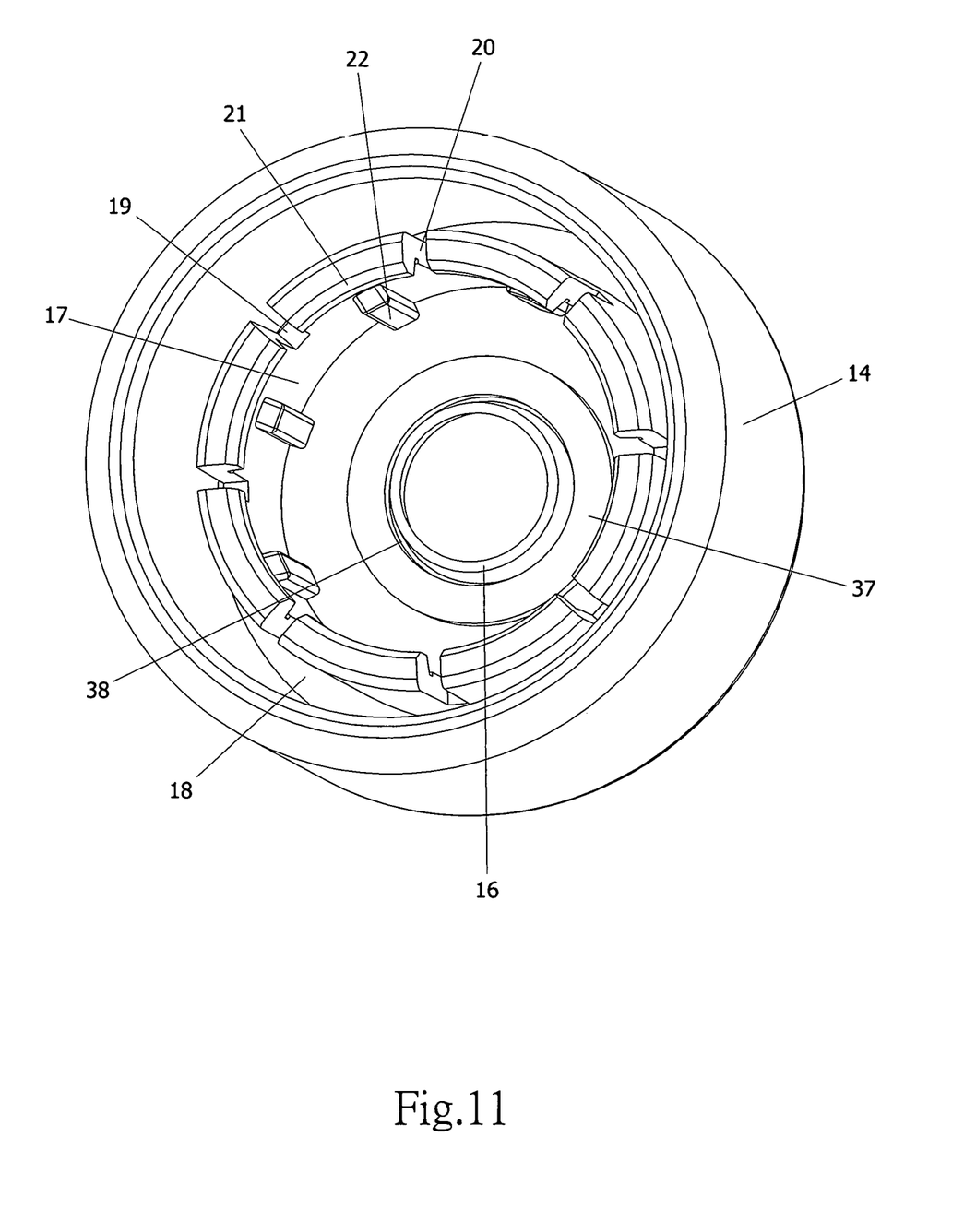
FIG. 11 is a stereogram of the pot plug.

The inner wall of retaining ring 17 is provided with circumferentially distributed guide blocks 22, the diameter d1 of the inner circle formed of several guide blocks 22 is smaller than the diameter d2 of the inner circle formed of several hooks 21. Therefore, when the guide blocks 22 cling to the outer wall of joint 4, the hooks 21 don't contact the outer wall of joint 4, the hooks 21 will not disturb the guiding effect of guide blocks 22. The pot plug 14 is fitted on joint 4 straightforward under the guiding effect of guide blocks 22, to avoid the tilt of pot plug 14 leading to seizure in the fitting process.

Figure 12:
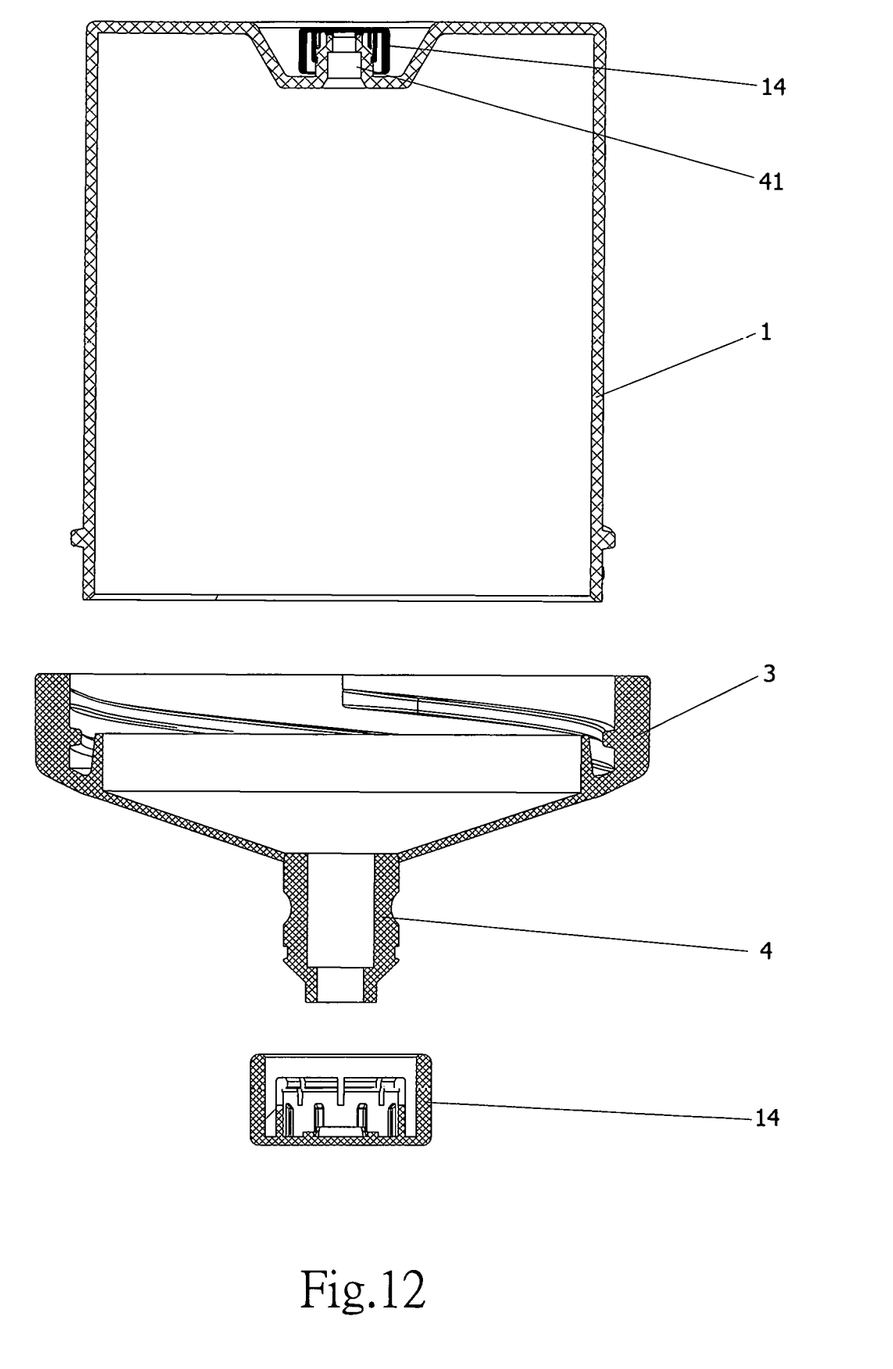
FIG. 12 is a schematic diagram of an air hole in a bottom of the pot body of the paint pot.

The air hole 41 is blocked when spray coating is not required. The blocking is removed before spray coating. For good airtightness, the conventional blocking is fixed to the air hole 41 very tightly, a very strong force is required to remove the blocking. However, if the force is too strong, the pot body 1 is likely to shake and the paint is likely to spill out when removing the blocking, and the paint adheres to the surface of pot body. The pot plug 14 of the present invention can replace the conventional blocking, the pot plug 14 can be removed with a light force, and the spray gun is held in one hand while the pot plug is removed by the other hand, the pot body 1 will not be shaken and the paint will not spill.

The above only describes some exemplary embodiments of the present invention. Those having ordinary skills in the art may also make many modifications and improvements without departing from the conception of the invention, which shall all fall within the protection scope of the invention.

We claim:

1. A disposable cleaning-free paint pot comprising:
   a pot body and a pot lid covering an opening of the pot body, the pot lid including a pot lid connector and a feed hole disposed in the pot lid connector;
   wherein the pot body is made of disposable transparent aviation material; the pot lid connector includes an adapter or a pot plug sleeved thereon; the adapter having positioning blocks symmetrically disposed in an inner wall thereof and an external thread disposed at one end thereof; the pot lid connector includes positioning slots engaging with the positioning blocks and an annular groove disposed on an outer wall thereof; the adapter includes mobile holes disposed symmetrically on both sides thereof, a press plate hinged to the mobile hole, and a clamping cam connected to the press plate; the clamping cam partially passes through the mobile hole into the adapter and corresponds to the annular groove; the pot lid connector includes an annular recess disposed outside thereof;
   wherein the pot plug seals the feed hole and includes a ring sealed tube disposed in an inner wall of an upper end thereof and engaging with the feed hole, the ring sealed tube is obverse truncated cone shape; a retaining ring disposed therein, surrounding the ring sealed tube, and having a movable space between the retaining ring and the inner wall of the pot plug; a plurality of buffer slots distributed uniformly in circumference of the retaining ring; a plurality of elastic strips formed uniformly on circumference of the retaining groove; a plurality of hooks disposed in a bottom inner wall of the elastic strip and engaging with the annular groove; a plurality of guide blocks disposed in an inner wall of the retaining ring and distributed uniformly in circumference, the plurality of guide blocks forming an inner circle diameter d1 which is smaller than an inner diameter d2 formed by the plurality of hooks; and a resilient groove disposed in the bottom inner wall of the elastic strip, which is disposed above the plurality of hooks.

2. The disposable cleaning-free paint pot according claim 1, wherein the feed hole includes a restraining step disposed therein; a matching filter disposed therein, a bottom of the matching filter attached to the restraining step; and a lifting stem protruding into an inner space of the pot lid in the top of the matching filter.

3. The disposable cleaning-free paint pot according to claim 1, wherein the pot lid connector includes a seal portion disposed at one end thereof; the seal portion is cylindrical; the seal portion and the pot lid connector are transitionally connected by a cone step; the adapter includes a closed cell disposed therein and sealed with seal portion, and a beveled step bonding the cone step; the closed cell and seal portion are a cylinder seal therebetween, and the cone step and beveled step are a cone seal therebetween.

4. The disposable cleaning-free paint pot according to claim 1, wherein the pot lid includes an annular inner cone disposed therein and a caulking groove formed between the inner cone and an inner wall thereof; one end with the opening of the pot body is embedded in the caulking groove; an outer cone of the inner cone and an inner wall of the pot body bond together.

5. The disposable cleaning-free paint pot according to claim 1, wherein an inner wall of the pot body is covered with nano-coating.

6. The disposable cleaning-free paint pot according to claim 1, wherein the pot body includes forward scale marks and reverse scale marks disposed on an outer wall thereof; the forward scale marks start from one end without the opening of the pot body, extending towards the end with the opening of the pot body, and the graduation increases gradually; the reverse scale marks start from the end with the opening of the pot body, extending towards the other end of the pot body, and the graduation increases gradually.

7. The disposable cleaning-free paint pot according to claim 1, wherein a screw thread for connecting the pot body to pot lid is three-start screw.

8. The disposable cleaning-free paint pot according to claim 1, wherein the ring sealed tube and retaining ring have a spacing ring therebetween, the spacing ring is opposite to pot lid connector; the height of the spacing ring is smaller than the height of ring sealed tube; a lower end face of the spacing ring is even with an outer end face of the pot lid connector; the spacing ring and the ring sealed tube have a flexible spacing disposed therebetween.

9. The disposable cleaning-free paint pot according to claim 1, wherein the annular groove includes an acclivitous upper bevel face disposed on an upper wall thereof; the plurality of hooks include a declivitous lower bevel face disposed at an upper end thereof, the lower bevel face and upper bevel face bond tightly.

* * * * *